United States Patent [19]

Abo et al.

[11] Patent Number: 4,545,265
[45] Date of Patent: Oct. 8, 1985

[54] HYDRAULIC CONTROL SYSTEM FOR CONTINUOUSLY VARIABLE V-BELT TRANSMISSION

[75] Inventors: Keiju Abo, Yokosuka; Sigeaki Yamamuro, Zushi; Yoshikazu Tanaka; Haruyoshi Kumura, both of Yokohama; Hiroyuki Hirano, Yokosuka, all of Japan

[73] Assignee: Nissan Motor Co., Ltd., Yokohama, Japan

[21] Appl. No.: 543,839

[22] Filed: Oct. 20, 1983

[30] Foreign Application Priority Data

Oct. 22, 1982 [JP] Japan .................. 57-184625

[51] Int. Cl.[4] .................. B60K 41/12; B60K 41/16
[52] U.S. Cl. .................. 74/868; 74/864; 74/878; 74/867
[58] Field of Search .................. 474/11, 12, 18, 28; 74/867, 868, 869, 878, 861, 863, 864

[56] References Cited

U.S. PATENT DOCUMENTS

| | | | |
|---|---|---|---|
| 3,893,344 | 7/1975 | Dantlgraber et al. | 474/28 X |
| 4,152,947 | 5/1979 | Van Deursen et al. | 474/28 X |
| 4,161,894 | 7/1979 | Giacosa | 474/28 X |
| 4,400,164 | 8/1983 | Cadee | 474/28 X |
| 4,459,878 | 7/1984 | Frank | 74/863 X |
| 4,475,416 | 10/1984 | Underwood | 474/28 X |
| 4,476,746 | 10/1984 | Miki et al. | 474/18 X |

FOREIGN PATENT DOCUMENTS 2703488  8/1977  Fed. Rep. of Germany ........ 474/28

OTHER PUBLICATIONS

"Kikai Kogaku Binran", issued in 1950, pp. 7-58 and 7-59.

Primary Examiner—George H. Krizmanich
Assistant Examiner—Dirk Wright
Attorney, Agent, or Firm—Schwartz, Jeffery, Schwaab, Mack, Blumenthal & Evans

[57] ABSTRACT

A maximum reduction ratio maintaining valve is fluidly disposed between a drive pulley and a shift control valve which controls the supply of fluid to and discharge thereof from the drive pulley. The maximum reduction ratio maintaining valve drains the drive pulley to set a reduction ratio between the drive and driven pulleys at the largest reduction ratio to facilitate starting a vehicle.

5 Claims, 3 Drawing Figures

HYDRAULIC CONTROL SYSTEM FOR CONTINUOUSLY VARIABLE V-BELT TRANSMISSION

CROSS-REFERENCES TO RELATED APPLICATIONS

Reference is made to the following U.S. patent applications: U.S. patent application No. 362,488, filed Mar. 26, 1982 and No. 489,600 filed on Apr. 28, 1983. Reference is also made to the following related copending applications: each filed by the same applicants concurrently with the present application; U.S. patent application Ser. No. 543,838; U.S. patent application Ser. No. 544,071; U.S. patent application Ser. No. 544,066; and U.S. patent application Ser. No. 543,840.

BACKGROUND OF THE INVENTION

The present invention relates to a hydraulic control system for a continuously variable V-belt transmission.

In the case of a continuously variable V-belt transmission resulting from combining a continuously variable V-belt transmission mechanism with a multiple plate wet type starting clutch, the continuously variable V-belt transmission is controlled to provide the largest reduction ratio upon starting a vehicle. This is because if the starting clutch is engaged with a small reduction ratio, a sufficiently large traction force can not be produced, resulting in stalling of the engine. However, since the conventional hydraulic control system is not equipped with a maximum reduction ratio maintaining valve that puts the continuously variable V-belt transmission mechanism into the largest reduction ratio upon starting the vehicle irrespective of the state of a shift control valve, it has been difficult to start the vehicle if the shift control valve goes out of order and fails to puts the transmission mechanism into the largest reduction ratio state.

SUMMARY OF THE INVENTION

According to the present invention, a hydraulic control system for a continuously variable V-belt transmission, having a starting clutch, for a vehicle is provided with a shift control valve which controls the distribution of fluid pressure to a drive pulley and a driven pulley to vary a reduction ratio between the drive and driven pulleys, and a maximum reduction ratio maintaining valve which is responsive to a signal indicative of a revolution speed of the drive pulley and sets the reduction ratio between the drive and driven pulleys at the largest reduction ratio irrespective of the state of the shift control valve, thereby to facilitate starting the vehicle.

An object of the present invention is to provide a hydraulic control system for a continuously variable V-belt transmission wherein the largest reduction ratio is established and maintained until a starting clutch is engaged upon starting the vehicle whereby the starting of the vehicle is facilitated, should a shift control valve fail to establish the largest reduction ratio.

DETAILED DESCRIPTION OF THE INVENTION

Figure 1:
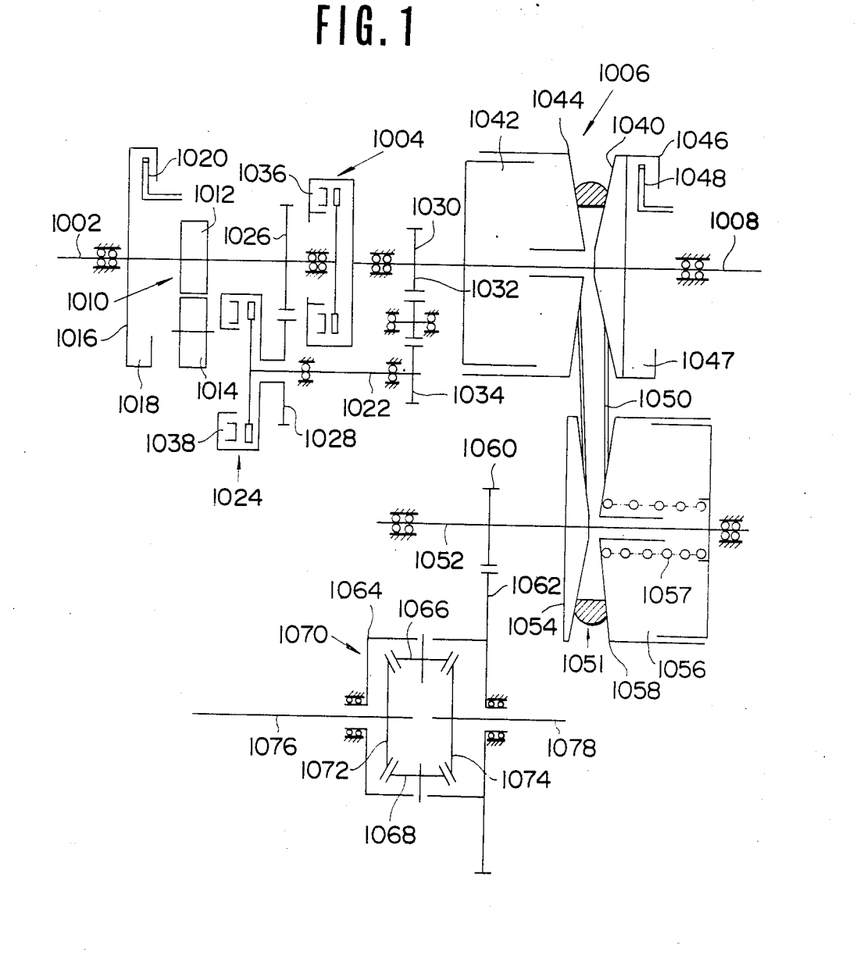
FIG. 1 is a diagrammatic view of a transmission mechanism of a continuously variable V-belt transmission.
Figure 2A:
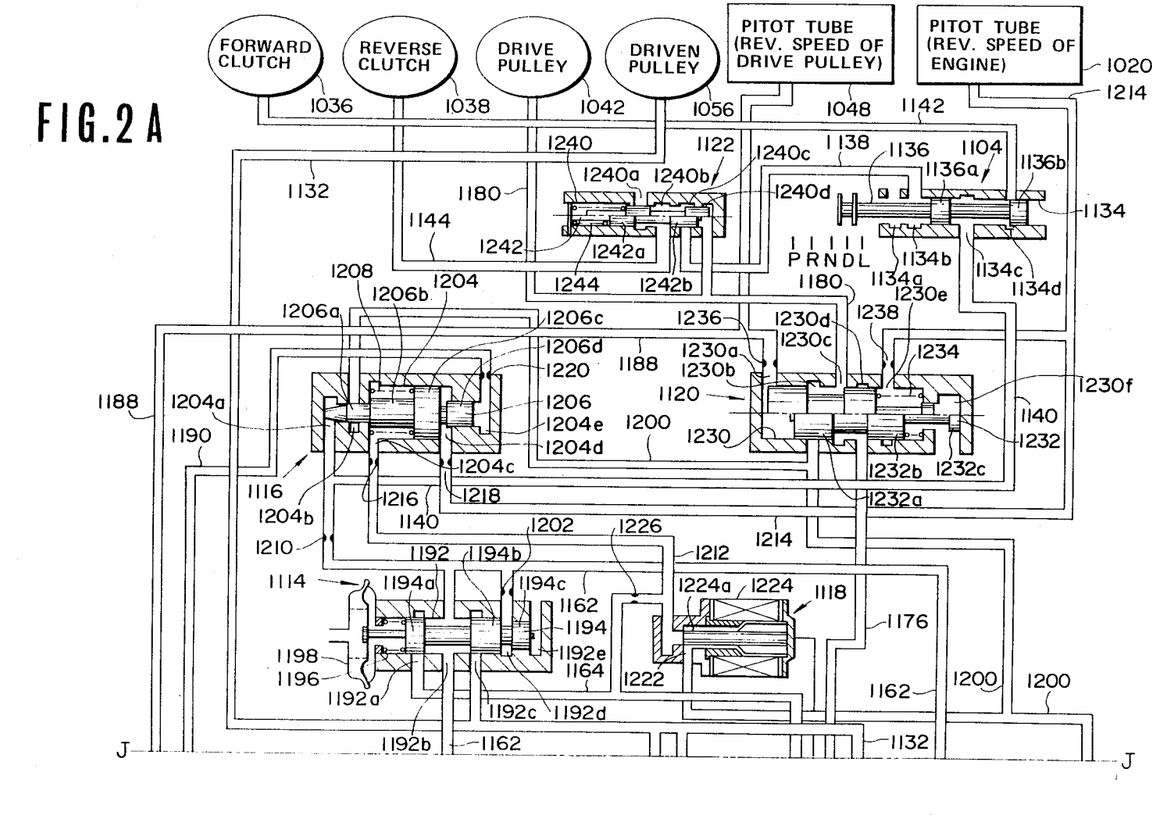
FIGS. 2A and 2B, when combined, illustrate a hydraulic control system for the continously variable V-belt transmission according to the present invention.
Figure 2B:
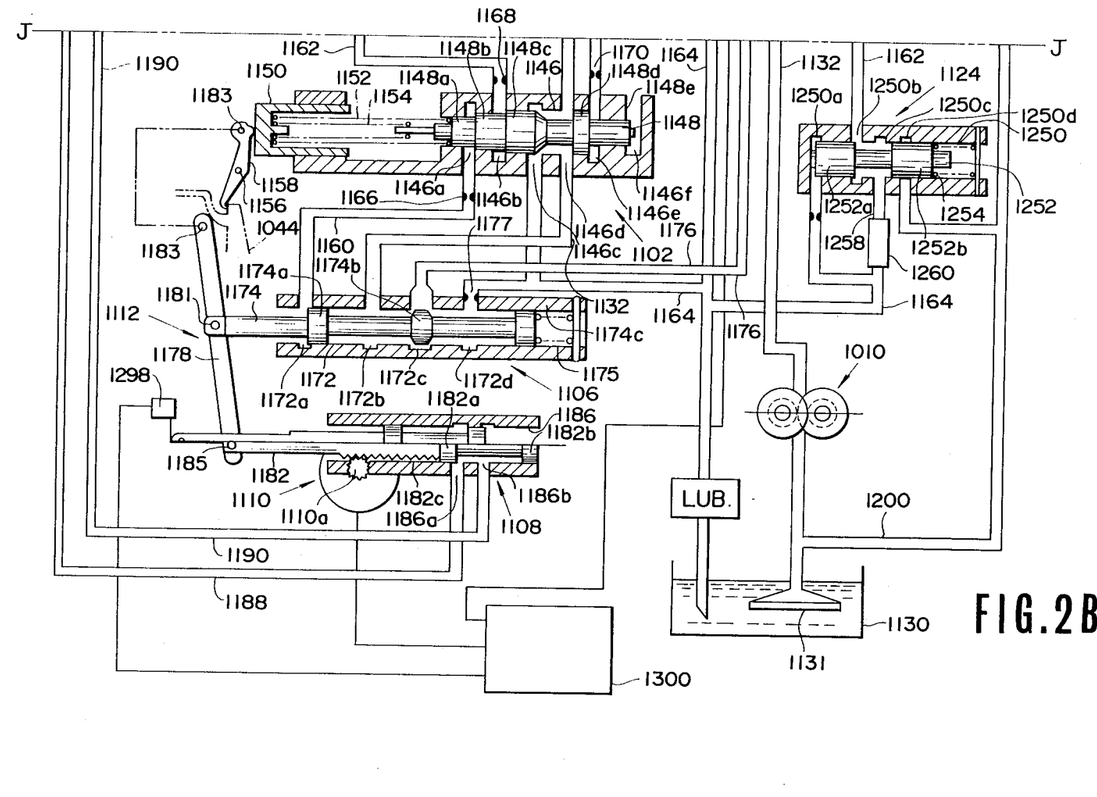

Referring to FIGS. 1, 2A and 2B, the present invention is described hereinafter.

Referring to the power transmission mechanism illustrated in FIG. 1, an input shaft 1002 coupled with an engine crankshaft, not shown, is connectable via a forward clutch or a starting clutch 1004 with a drive shaft 1008 having thereon a drive pulley 1006. The starting clutch 1004 is a well known wet type multiple plate clutch which is shown in FIG. 120 on page 7-59 of chapter 7 of "Kikai Kogaku Binran" issued in 1950. Mounted on the input shaft 1002 is an oil pump 1010 of the external gearing type which is a source of oil pressure of a later described hydraulic pressure control device. The oil pump 1010 has a drive gear 1012 and a driven gear 1014. Secured unitarily to the input shaft 1002 is a rotary endless flume 1016, which flume 1016 is formed by curling inwardly the outer periphery of a generally disc-like plate to form an oil reservoir 1018 which controls oil rotatable with the flume 1016. Preferrably, the bottom of the oil reservoir 1018 is formed with a series of recesses which serve as vanes to let the oil follow a change in rotation of the rotary endless flume 1016. The flume 1016 is provided with a pipe (not shown) through which a predetermined amount of oil is supplied to the oil reservoir 1018. Provided in the oil reservoir of the flume 1016 is a pitot tube 1020 which has its tube opening pointing into the oil flowing together with the flume 1016, which pitot tube 1020 measures the dynamic pressure of the flowing oil within the oil reservoir 1018. An auxiliary shaft 1022 is rotatably arranged in parallel to the input shaft 1002 and has mounted on one end thereof a reverse clutch 1024 which may be called a starting clutch. The input shaft 1002 and auxiliary shaft 1022 have thereon gears 1026 and 1028, respectively, which are meshed with each other. The gear 1026 is constantly rotatable with the input shaft 1002, and the gear 1028 is rotatable with the auxiliary shaft 1022 through the reverse clutch 1024. The auxiliary shaft 1022 has on the other end thereof an integral gear 1034 which meshes with a rotatably carried gear 1032. The gear 1032 meshes with a gear 1030 rotatable with drive shaft 1008. The forward clutch 1004 and reverse clutch 1024 are engaged when the oil pressure is delivered to the piston chambers 1036 and 1038 thereof, respectively. When the forward clutch 1004 is engaged, the engine rotation from the input shaft 1002 is transmitted directly to the drive shaft 1008, while when the reverse clutch 1024 is engaged, the engine rotation is transmitted to the drive shaft 1008 through the gears 1026, 1028, 1034, 1032 and 1030 where the direction of rotation is reversed. The drive pulley 1006 comprises a fixed conical disc 1040 integrally formed with the drive shaft, and a movable conical disc 1044 which faces the fixed conical disc 1040 to form a V-shaped pulley groove therebetween and is axially movable in response to the oil pressure acting within the drive pulley cylinder chamber 1042. The maximum width of the V-shaped pulley groove is defined by a stop (not illustrated) which engages the movable conical disc 1044 after it has moved to the left as viewed in the Figure, by a predetermined amount. The fixed conical disc 1040 of the drive pulley 1006 is provided with a rotary endless flume 1046 similar to the before mentioned flume 1016. The dynamic pressure of the oil within an oil resevoir 1047 of the flume 1046 is measured by a pitot tube 1048, and a predetermined amount of oil is constantly supplied to the oil reservoir by an oil tube (not illustrated). The drive pulley 1006 is connected with the driven pulley 1051 by a V-belt running therearound, and the driven pulley 1051 is mounted on a freely rotatable driven shaft 1052. The driven pulley 1051 comprises a fixed conical disc 1054 formed integrally with the driven shaft 1052, and a movable conical disc 1058 which faces the fixed conical disc 1054 to form a V-shaped pulley groove and is axially movable due to the oil pressure acting within the driven pulley cylinder chamber 1056 and a spring 1057 therein. Likewise to the drive pulley 1006, the axial movement of the movable conical disc 1058 is limited by a stop, not illustrated, so that the width of the V-shaped pulley groove does not exceed the maximum width thereof. The effective pressure acting area in the driven pulley cylinder chamber 1056 is half as much as that in the drive pulley cylinder chamber 1042. A gear 1060 formed integrally with the driven shaft 1052 meshes with a gear 1062. Thus, the rotary power of the driven shaft 1052 is transmitted through the gear to a ring gear 1062. A differential case to which the ring gear 1062 is secured accommodates therein a differential 1070 composed of a pair of pinion gears 1066 and 1068 and a pair of side gears 1072 and 1074 meshing with the corresponding pinion gears 1066 and 1068. Output shafts 1076 and 1078 are coupled with the side gears 1072 and 1074, respectively.

Rotary power fed from the engine crankshaft to the power transmission mechanism mentioned above of the continuously variable transmission is transmitted via the forward clutch 1004 to the drive shaft 1008 (or a power flow from the input shaft 1002 to the drive shaft 1008 via gear 1026, gear 1028, reverse clutch 1024, auxiliary shaft 1022, gear 1034, gear 1032 and gear 1030), and thereafter is transmitted to the drive pulley 1006, V-belt 1050, driven pulley 1051, driven shaft 1052, gear 1060 and ring gear 1062, and then to the output shafts 1076 and 1078 owing to the function of the differential 1070. During the power transmission with the forward cluth 1004 engaged and the reverse clutch 1024 released, the drive shaft 1008 rotates in the same direction as the input shaft 1002 does, and thus the output shafts 1076 and 1078 are turned forwardly. In the reverse case where the forward clutch 1004 is released and the reverse clutch 1024 is engaged, the drive shaft 1008 rotates in the reverse direction to the rotational direction of the input shaft 1002, and thus the output shafts 1076 and 1078 are turned in the reverse direction. During the transmission of power, the ratio of rotation of the drive pulley 1006 to that of the driven pulley 1051 may be varied by axially moving the axially movable conical disc 1044 of the drive pulley 1006 and the movable conical disc 1058 of the driven pulley 1051 so as to change the V-belt contacting radius of each of the pulleys. For example, increasing the width of the V-shaped pulley groove of the drive pulley 1006 and at the same time decreasing the width of the driven pulley 1051 will cause a reduction in the V-belt contacting radius of the drive pulley 1006 and an increase in the V-belt contacting radius of the driven pulley 1051, thus providing a larger reduction ratio. If the axially movable conical discs 1030 and 1046 are moved in the reverse directions thereof, the reduction ratio becomes small.

Hereinafter, a hydraulic control system for the continuously variable transmission is described. The hydraulic pressure control system comprises, as shown in FIGS. 2A and 2B, an oil pump 1010, a line pressure regulator valve 1102, a manual valve 1104, a shift control valve 1106, a clutch complete engagement control valve 1108, a shift motor 1110, a shift operating mechanism 1112, a throttle valve 1114, a starting valve 1116, a start adjust valve 1118, a maximum reduction ratio maintaining valve 1120, a reverse inhibitor valve 1122 and a lubrication valve 1124.

The oil pump 1010 is driven by the input shaft 1002 as mentioned before to draw in oil from the tank 1130 via a strainer 1131 and discharges it to an oil conduit 1132. The discharged oil in the oil conduit 1132 is introduced to ports 1146a and 1146e of the line pressure regulator valve 1102 and is regulated to a predetermined pressure which is used as a line pressure. The oil conduit 1132 communicates also with a port 1192c of the throttle valve 1114 and a port 1172b of the shift control valve 1106. Further the oil conduit 1132 communicates also with the driven pulley cylinder chamber 1056. This means that the line pressure is always supplied to the driven pulley cylinder chamber 1056.

The manual valve 1104 comprises a valve bore 1134 having four parts 1134a, 1134b, 1134c and 1134d, and a spool 1136, having two lands 1136a and 1136b thereon, corresponding to the valve bore 1314. The spool 1136 actuated by a selector lever (not illustrated) near a driver's seat has five detent positions P, R, N. D and L. The port 1134a is a drain port and the port 1134b communicates with a port 1240c of the reverse inhibitor valve 1122 through an oil conduit 1138. A port 1134c communicates with the port 1204 of the starting valve 1116 through an oil conduit 1140, while a port 1134d communicates with the piston chamber 1036 of the forward clutch 1004 through an oil conduit 1142. When the spool 1136 is in the position P, the land 1136b closes the port 1134c which is supplied with a start pressure from an oil conduit 1140, the piston chamber 1036 of the forward clutch 1004 is drained via the oil conduit 1142 and the port 1134d, and the piston chamber 1038 of the reverse clutch 1024 is drained through an oil conduit 1144, the port 1240b of the reverse inhibitor valve 1122, an oil conduit 1138 and the port 1134b. When the spool 1136 is in the position R, the port 1134b is allowed to communicate with the port 1134c via a chamber formed between the lands 1136a and 1136b, and (if the reverse inhibitor valve 1122 is in the position illustrated by the upper half,) the piston chamber 1038 of the reverse clutch 1024 is supplied with start pressure from the oil conduit 1140, while the piston chamber 1036 of the forward clutch 1004 is drained via the port 1134d. Since if the spool 1136 is in the position N, the port 1134c is prevented from communicating with the other ports because it is positioned between the lands 1136a and 1136b, and the ports 1134b and 1134d are both drained, the piston chamber 1038 of the reverse clutch 1024 and the piston chamber 1036 of the forward clutch 1004 are drained as they are in the case of position P. When the spool 1136 is in the position D or L, the port 1136a is allowed to communicate with the port 1134b through the chamber between the lands 1136a and 1136b, and thus the line pressure is supplied to the piston chamber 1036 of the forward clutch 1004, while the piston chamber 1038 of the reverse clutch 1024 is drained via the port 1134b. Therefore, when the spool 1136 is in the position P or N, both the forward and reverse clutches 1004 and 1024 are released to interrupt the transmission of power, thus preventing the rotary power from being transmitted from the input shaft 1002 to the drive shaft 1008; when the spool 1136 is in the position R, the reverse clutch 1024 is engaged (in the case where the reverse inhibitor valve 1122 is in the position illustrated by the upper half thereof) to rotate the output shafts 1076 and 1078 in the reverse direction as mentioned before; and when the spool 1136 is in the position D or L, the forward clutch 1004 is engaged to rotate the output shafts 1076 and 1078 in the forward direction. Although there occurs no difference in the operation of the hydraulic circuit between the position D and the position L as mentioned before, the difference between these positions is electrically detected and operation of a later described shift motor 1110 is controlled so that the reduction ratio is controlled in response to different shift patterns.

The line pressure regulator valve 1102 comprises a valve bore 1146 provided with six ports 1146a, 1146b, 1146c, 1146d, 1146e and 1146f, a spool 1148, corresponding to the valve bore 1146, having thereon five lands 1148a, 1148b, 1148c, 1148d and 1148e, an axially movable sleeve 1150, and two springs 1152 and 1154 operatively disposed between the spool 1148 and sleeve 1150. The sleeve 1150 is engaged by a lever 1158 pivotable about a pin 1156 and subject to a pressing force by one end of the lever. The other end of the lever 1158 is engaged in a groove at the periphery of the movable conical disc 1044 of the drive pulley 1006. Thus, the sleeve 1150 moves to the right as viewed in the Figure as the reduction ratio becomes larger, while it moves to the left as the reduction ratio becomes smaller. Among the two springs, the outer one is always engaged at the both ends thereof by the sleeve 1150 and spool 1148 and held in a compressed state, while the inner one is not compressed until the sleeve 1150 has moved to the right as viewed in the Figure by a predetermined amount. The port 1146a of the line pressure regulator valve 1102 is connected via an oil conduit 1160 with a port 1172a of the shift control valve 1106. The port 1146b is supplied with throttle pressure from an oil conduit 1162 forming a throttle pressure circuit. The port 1146c communicates with an oil conduit 1164 forming a lubrication circuit. The ports 1146d and 1146e are supplied with the line pressure from the oil conduit 1132 forming the line pressure circuit. The port 1146f is a drain port. The ports 1146a, 1146b and 1146c are provided at their inlets with orifices 1166, 1168 and 1170, respectively. Consequently, there are applied to the spool 1148 of the line pressure regulator valve 1102 three rightwardly directed forces, one by the spring 1152 (or by the springs 1152 and 1154), another by the oil pressure at the port 1146a acting on a differential area between the lands 1148b and 1148c and the other by the oil pressure (throttle pressure) at the port 1146b acting upon the differential pressure between the lands 1148b and 1148c, and a leftwardly directed force by the oil pressure (line pressure) at the port 1146e acting on the differential area between the lands 1148d and 1148e, and thus the spool 1148 controls the line pressure at the port 1146e by adjusting the drainage amount of flow of oil from the port 1146d to the port 1146c until the rightwardly directed forces balance with the leftwardly directed force. It follows that the larger the reduction ratio, the higher the line pressure becomes, the higher the oil pressure at the port 1146a (this pressure is applied only when rapid shifting takes place as will be described later, the magnitude is the same as that of the line pressure), the higher the line pressure becomes, and the higher the throttle pressure applied to the port 1146b, the higher the line pressure becomes. The reason why the line pressure is controlled in this manner is to comply with the need to increase the V-belt gripping force by the pulleys as the reduction ratio increases, the need to quickly supply oil the to pulley cylinder chamber upon rapid shifting, and the need to increase the V-belt gripping force by the pulleys as the throttle pressure increases (i.e., as the engine intake manifold vacuum decreases) so as to increase power transmission torque due to the friction because the engine torque increases under this condition.

The shift control valve 1106 comprises a valve bore 1172 provided with four ports 1172a, 1172b, 1172c and 1172d, a spool 1174, corresponding to the valve bore 1172, having three lands 1174a, 1174b and 1174c, and a spring 1175 pressing the spool 1174 to the left viewing in the Figure. As described before, the port 1172a communicates with the port 1146a of the line pressure regulator valve 1102, the port 1172b communicates with the oil conduit 1132 forming the line pressure circuit to be supplied with the line pressure, the port 1172c communicates with the port 1230d of the maximum reduction ratio maintaining valve 1120, and the port 1172d communicates with the oil conduit 1164 forming the lubricant circuit. The port 1172d is provided at its inlet with an orifice 1177. The left end of the spool 1174 is linked with a lever 1178 of a later described shift operating mechanism 1112 by a pin 1181 at the center thereof. The axial width of the land 1174b is set slightly shorter than the width of the port 1172c. Although the line pressure supplied to the port 1172b flows into the port 1172c through a clearance between the lefthand side, viewing in the Figure, of the land 1174b and the wall of the port 1172c, a portion of it is discharged through a clearance between the righthand side, viewing in Figure, of the land 1174b and the port 1172c, so that the pressure at the port 1172c is determined by the ratio between the areas of the above mentioned clearances. Therefore, the pressure at the port 1172c increases gradually as the spool 1174 moves leftwardly because during this movement the line pressure side clarance increases, while the discharge side clearance decreases. The pressure at the port 1172c is supplied to the drive pulley cylinder chamber 1042 via an oil conduit 1176, the maximum reduction ratio maintaining valve 1120 (if it assumes the position illustrated by the lower half thereof) and an oil conduit 1180. This causes an increase in pressure within the drive pulley cylinder chamber 1042 of the drive pulley 1006, resulting in a decrease in width of the V-shaped pulley groove, while, on the other hand, the width of the V-shaped pulley groove of the driven pulley 1051 is increased by the V-belt because the gripping force decreases relatively to that by the drive pulley owing to the fact that the driven pulley cylinder chamber 1056 is always supplied with the line pressure from the oil conduit 1132, but the effective pressure acting area of the driven pulley cylinder chamber 1056 is about half as much as that of the drive pulley cylinder chamber 1042. Thus, the reduction ratio decreases because the V-belt contacting radius of the drive pulley 1006 increases and at the same time the V-belt contacting radius of the driven pulley 1051 decreases. In the reverse case where the spool 1172 is moved leftwardly, the reverse action to the above described case takes place and the reduction ratio increases.

The lever 1178 of the shift operating mechanism 1112 which as described before has at the center thereof connected by the pin 1181 with the spool 1174 of the shift control valve 1106, has one end thereof connected by the pin 1183 with that end of the lever 1158 which is contacted by the sleeve 1150 (although in the illustration the pin 1183 on the lever 1158 is illustrated separately from the pin 1183 on the lever 1178, they are the same part), and has the other end thereof connected by a pin 1185 with a rod 1182. The rod 1182 is formed with a rack 1182c which meshes with a pinion gear 1110a of the stepper motor 1110. With this shift control mechanism 1112, if the pinion gear 1110a of the stepper motor 1110 controlled by a control unit 1300 is rotated in a direction to cause the righward movement of the rod 1182, the lever 1178 rotates counterclockwise with the pin as a fulcrum, thus urging the spool 1174 linked to the lever 1178 to move rightwardly. This rightward movement causes the reduction ratio to decrease because as described before the movable conical disc 1044 of the drive pulley 1006 moves rightwardly to decrease the width of the V-shaped pulley groove of the drive pulley 1006 and at the same time this causes the V-belt to widen the V-shaped pulley groove of the driven pulley 1051. Since the one end of the lever 1178 is connected by the pin 1183 with the lever 1158, the rightward movement of the movable disc 1044 causes the lever 1158 to rotate counterclockwise, thus causing the lever 1178 to rotate counterclockwise with the pin 1185 as a fulcrum. With this movement of the lever 1178, the spool 1174 is pulled back leftwardly, and thus the drive pulley 1006 and driven pulley 1051 tend to assume a larger reduction ratio state thereof. As a result of these movements, the drive pulley 1006 and driven pulley 1051 are stabilized in a state where a reduction ratio corresponding uniquely to each rotary position of the stepper motor 1110 is achieved. If the stepper motor 1110 is rotated in the reverse direction, a similar operation takes place until the pulleys are stabilized (the rod 1182 is movable beyond a position corresponding to the maximum reduction ratio to the left, viewing in the Figure, (an overstroke range), and a shift reference switch 1298 is turned on when the rod 1182 has plunged into the overstroke range, the output signal of the shift reference switch 1298 being fed to the control unit 1300). From the above description, it will be understood that if the stepper motor 1110 is operated in accordance with a poredetermined shift pattern, the reduction ratio varies accordingly, then making it possible to control the reduction ratio in the continuously variable transmission by controlling the stepper motor 1110.

Immediately after the stepper motor 1110 is actuated rapidly toward the larger reduction ratio side, the spool 1174 of the shift control valve 1106 moves temporarily to the left viewing in the Figure (but it returns gradually to the center position thereof as the shifting operation progresses). If the spool 1174 moves greatly to the left, the port 1172a communicates with the port 1172b via a chamber between the lands 1174a and 1174b, thus delivering the line pressure to the port 1146a of the line pressure regulator valve 1102, resulting in an increase in the line pressure as described above. In this manner, the line pressure is increased upon rapid shifting toward the larger reduction ratio side. This increase in the line pressure causes a quick supply of oil to the driven pulley cylinder chamber 1056, resulting in a quick change in reduction ratio.

The stepper motor 1110 is controlled by the control unit 1300 to assume a rotary position determined by pulse signals sent out by the control unit.

The clutch complete engagement control valve 1108 has a valve element thereof integral with the rod 1182 of the shift operating mechanism 1112. That is, the clutch complete engagement control valve 1108 comprises a valve bore 1186 provided with ports 1186a and 1186b and lands 1182a and 1182b formed on the rod 1182. The port 1186a communicates with the pitot tube 1048 through the oil conduit 1188. This means that the port 1186a is supplied with a signal oil pressure corresponding to revolution speed of the drive pulley 1006. The port 1186b communicates with a port 1204e of the starting valve 1116 through the oil conduit 1190. Normally, the port 1186a communicates with the port 1186b via the chamber between the lands 1182a and 1182b, but the port 1186a is blocked and the port 1186b is drained upon or after the rod 1182 has plunged into the overstroke range beyond the position corresponding to the maximum reduction ratio (i.e., the position where the shift reference switch 1298 is turned on). That is, the clutch complete engagement control valve 1108 normally supplies to the port 1204e of the starting valve 1116 the drive pulley revolution speed indicative signal pressure, and ceases to supply the above mentioned signal pressure after the rod 1182 has moved into the overstroke range beyond the maximum reduction ratio position.

The throttle valve 1114 comprises a valve bore 1192 provided with ports 1192a, 1192b, 1192c, 1192d and 1192e, a spool 1194, corresponding to the valve bore 1192, having three lands 1194a, 1194b and 1194c, a spring 1196 biasing the spool 1194 to the right viewing in the Figure, and a vacuum diaphragm 1198 applying a pushing force to the spool 1194. The vacuum diaphragm 1198 applies to the spool 1194 a force inversely proportional to the engine manifold vacuum when the engine manifold vacuum is lower (gets near the atmospheric pressure) than a predetermined value (for example, 300 mmHg), while when it is higher than the predetermined value, it applies no force to the spool. The port 1192a communicates with the oil conduit 1164 forming the lubrication circuit, the ports 1192b and 1192d communicate with the oil conduit 1132 forming the line pressure circuit, and the port 1192e is a drain port. The port 1192d is provided at its inlet with an orifice 1202. There are applied to the spool 1194 rightwardly directed force, as viewed in the Figure, one force by the spring 1196 and the other force by the vacuum diaphragm 1198, and a leftwardly directed force by the oil pressure acting on the pressure differential between the lands 1194b and 1194c, and thus the throttle valve 1114 performs a well known pressure regulating operation using the line pressure at the port 1192c as a source of pressure and the port 1192a as a discharge port until the above mentioned opposed forces balance with each other. This results in the production of the throttle pressure at the ports 1192b and 1192d which pressure corresponds to forces due to the spring 1196 and the vacuum diaphragm. The throttle pressure thus obtained corresponds to the engine output torque because it is regulated in response to the engine manifold vacuum. Thus, the throttle pressure increases as the engine torque increases.

The starting valve 1116 comprises a valve bore 1204 provided with ports 1204a, 1204b, 1204c, 1204d and 1204e, a spool 1206 having thereon lands 1206a, 1206b, 1206c and 1206d (the land 1206a has on the lefthand side a tapered portion), and a spring 1208 biasing the spool 1206 rightwardly, as viewed in the Figure. The port 1204a communicates with the oil conduit 1140 which connects via an orifice 1210 with the oil conduit 1162 forming the throttle pressure circuit. The port 1204b is drained through the oil conduit 1200 forming a drain circuit (this oil conduit communicating with a portion between the oil pump 1010 and the strainer 1131). The port 1204c is connected via the oil conduit 1211 with the start adjusting valve 1118. The port 1204d communicates via the oil conduit 1241 with the before described pitot tube 1020. This means that the port 1204d is supplied with a signal oil pressure corresponding to the revolution of the input shaft 1002 (i.e., an engine revolution speed signal oil pressure). The port 1204e communicates via the oil conduit 1190 with the port 1186b of the clutch complete engagement control valve 1108. The ports 1204c, 1204d and 1204e have at their inlets orifices 1216, 1218 and 1220, respectively. The starting valve 1116 has a function to reduce an oil pressure (start pressure) within the oil conduit 1140 to a level lower than the throttle pressure by discharging oil at the port 1204a to the port 1204b in response to the position of the spool 1206. If the spool 1206 is disposed to the left as viewed in the Figure, the oil pressure at the port 1204a is relatively high because a clearance passage from the port 1204a to the port 1204b is narrow, while if the spool 1206 has moved to the right, the oil pressure at the port 1204a drops because the clearance passage from the port 1204a to the port 1204b becomes wide and the amount of oil drainage increases. Since the oil conduit 1162 forming the throttle pressure circuit communicates via an orifice 1210 with the oil conduit 1140 forming the start pressure circuit, the throttle pressure in the oil conduit 1162 is not substantially affected even if the oil pressure in the oil conduit 1140 drops. The position of the spool 1206 is determined on the balance of rightwardly directed force by oil pressure (start adjustment pressure) acting on the differential area between the lands 1206b and 1206c with the total of leftwardly directed forces due to oil pressure (engine revolution speed signal pressure) acting on the differential area between the lands 1206c and 1206d and oil pressure (drive pulley revolution speed signal oil pressure) at the port 1204e acting on the land 1206d. That is, the higher the start adjustment pressure in the oil conduit 1212 generated by the later described start adjustment valve 1118, the lower the start pressure in the oil conduit 1140 becomes, and the higher the engine revolution speed signal oil pressure and/or the drive pulley revolution speed signal oil pressure, the higher the start pressure becomes. Upon starting the vehicle, the oil conduit 1190 is drained and thus the drive pulley revolution speed oil pressure signal does not act on the port 1204e of the starting valve 1116 because the rod 1182 of the before mentioned clutch complete engagement control valve 1108 is in the lefthand most position thereof. Accordingly, the start pressure is controlled in response to the start adjustment pressure and engine revolution speed signal oil pressure and thus gradually increases as the engine revolution speed increases. This pressure is supplied to the forward clutch 1004 (or reverse clutch 1024), causing the clutch to engage gradually, thus permitting the vehicle to start moving smoothly. As the vehicle has started to move, the clutch complete engagement control valve 1108 is switched by the stepper motor 1110, delivering through the oil conduit 1190 the drive pulley revolution speed signal pressure to the port 1204e, causing the start pressure to increase rapidly. With the rapid increase of the start pressure, the forward clutch 1004 (or reverse clutch 1024) is securely engaged and thus inhibited from slipping. Since the starting valve 1116 supplies to the forward clutch 1004 or the reverse clutch 1024 the pressure resulting from regulating the throttle pressure corresponding to the engine output torque supplied to the port 1204a, the forward clutch 1004 and reverse clutch 1024 are prevented from being exposed to higher pressure than necessary. This is advantageous for the purpose of enhancing the endurability of the forward clutch 1004 and reverse clutch 1024.

The start adjustment valve 1118 is composed of a force motor 1224 which regulates the flow rate of oil discharged from the oil conduit 1212 to the port 1222 (this port 1222 communicating with the oil conduit 1200 forming the drain circuit) by a plunger 1224a. To the oil conduit 1212, oil under low pressure is supplied via an orifice 1226 from the oil conduit 1164 forming the lubrication circuit. The oil pressure (start adjustment pressure) in the oil conduit 1212 is controlled in response to the current passing through the force motor 1224 because the force motor 1224 discharges the oil from the oil conduit 1212 inversely proportional to the current passing therethrough. The amount of current passing through the start adjustment valve 1118 is controlled such that upon the engine idling when the vehicle is at standstill, with the start adjustment pressure provided by this start adjustment pressure 1118, the start pressure (the pressure resulting from the regulation in the starting valve 1116) is controlled to a pressure state which allows the forward clutch 1004 or reverse clutch 1024 to assume the disengaged state immediately before the engagement thereof. Since this pressure is always supplied to the forward clutch 1004 or the reverse clutch 1024 before the vehicle starts to move, the forward clutch 1004 or the reverse clutch 1024 can immediately initiate engagement thereof in response to an increase in the engine revolution speed, thus preventing the engine from racing, and also unintentional movement of the vehicle is prevented even if the idling revolution speed of the engine is high.

The maximum reduction ratio maintaining valve 1120 comprises a valve bore 1230 provided with ports 1230a, 1230b, 1230c, 1230d, 1230e and 1230f, a spool 1232 having thereon 1232a, 1232b and 1232c, and a spring 1234 biasing the spool 1232 leftwardly viewing in the Figure. Supplied to the port 1230a is the drive pulley cylinder revolution speed signal oil pressure from the oil conduit 1188, the port 1230c communicates through the oil conduit 1180 with the drive pulley cylinder chamber 1042 and the port 1240d of the reverse inhibitor valve 1122, and the port 1230d communicates through the oil conduit 1176 with the port 1172c of the shift control valve 1106. The port 1230b is drained through the oil conduit 1200, and the port 1302f is a drain port. The ports 1230a and 1230e are provided at their inlets with orifices 1236 and 1238, respectively. The land 1232a is the same diameter as the land 1232b, and the land 1232c is smaller in diameter. This maximum reduction ratio maintaining valve 1120 functions to achieve the maximum reduction ratio upon initiation of vehicle movement irrespective of the state of the shift control valve 1106. Owing to the function of this valve, the vehicle is able to start to move with the maximum reduction ratio should the shift control valve 1106 be fixed in the smallest reduction ratio side due to trouble with the stepper motor 1110. When the vehicle is at standstill, the spool 1232 is biased by the spring 1234 to the position illustrated by the upper half thereof as viewed on the Figure because the drive pulley revolution speed signal oil pressure is zero so that there is no force pushing the spool 1232 to the right. As a result, the drive pulley cylinder chamber 1042 is drained through the oil conduit 1180, port 1230c, port 1230b and the oil conduit 1200, thus causing the continuously variable transmission to always achieve the maximum reduction ratio. This reduction ratio state is maintained until the rightwardly directed force as viewed in the Figure by the oil pressure at the port 1230a (drive pulley revolution speed signal oil pressure) acting on the differential area between the lands 1232b and 1232c overcomes the total of a leftwardly directed force by the oil pressure at the port 1230e (engine revolution speed signal oil pressure) acting on the differential area between the lands 1232b and 1232c and a leftwardly directed force by the spring 1234. This means that the maximum reduction ratio holds until the revolution speed of the drive pulley 1006 increases to some degree after the forward clutch 1004 has started to engage (i.e., slippage of the forward clutch 1004 becomes, small). When the drive pulley 1006 increases its revolution speed beyond a predetermined speed value, the maximum reduction ratio maintaining valve 1120 switches its state to the position illustrated by the lower half thereof viewing in the Figure, so that the oil pressure from the shift control valve 1106 starts to be supplied to the drive pulley cylinder chamber 1042, setting the continuously variable transmission in a state where the reduction ratio is shiftable. Once the spool 1232 of the maximum reduction ratio maintaining valve 1120 has shifted to the position illustrated by the lower half thereof, since the oil pressure acting on the pressure differential between 1232b and 1232c is drained, the spool 1232 does not return to the position illustrated by the upper half thereof until the drive pulley revolution speed signal oil pressure drops to an excessively low value. It follows that the maximum reduction ratio is achieved immediately before the vehicle comes to a standstill where the vehicle speed has dropped considerably. Since the drive pulley revolution speed signal pressure is zero while the drive pulley rotates in the reverse direction (i.e., a state where the reverse clutch 1024 is actuated), the maximum reduction ratio is achieved when the vehicle travels in the reverse direction.

The reverse inhibitor valve 1122 comprises a valve bore 1240 having ports 1240a, 1240b, 1240c and 1240d, a spool 1242 having lands 1242a and 1242b of the same diameter, and a spring 1244 biasing the spool 1242 rightwardly viewing in the Figure. The port 1240a is a drain port, the port 1240b communicates through the oil conduit 1144 with the piston chamber 1038 of the reverse clutch 1024, the port 1240c communicates through the oil conduit 1138 with the port 1134b of the manual valve 1104, and the port 1240d is connected with the oil conduit 1180 which supplied oil pressure to the drive pulley cylinder chamber 1042. This reverse inhibitor valve 1122 functions to prevent the reverse clutch 1024 from being actuated for engagement should if the manual valve 1104 is brought to the position R while the vehicle is travelling forwards. When the vehicle is at standstill, the oil conduit 1180 (i.e., the oil pressure within the drive pulley cylinder chamber 1042) is drained owing to the function of the before described maximum reduction ratio maintaining valve 1120. Thus, the spool 1242 is biased by the spring 1244 to the position illustrated by the upper half thereof because there occurs no leftwardly directed force viewing in the Figure on the spool 1242 of the reverse inhibitor valve 1122, thus allowing the port 1240b to communicate with the port 1240c. If, in this state, the manual valve 1104 selects the position R, the oil pressure at the port 1134b is supplied through the port 1240c, port 1240b and oil conduit 1144 to the piston chamber 1038 of the reverse clutch 1024. This causes the engagement of the reverse clutch 1024, the establishing the reverse drive. However, since the maximum reduction ratio maintaining valve 1120 stays in the position illustrated by the lower half thereof as long as the vehicle is travelling, the oil pressure is kept supplied to the oil conduit 1180 from the oil conduit 1176. This oil pressure continues to act on the port 1240d of the reverse inhibitor valve 1122 so that since the reverse inhibitor valve 1122 is maintained in the position illustrated by the lower half thereof, the communication between the oil conduit 1138 and the oil conduit 1144 is prevented and the oil pressure in the piston chamber 1038 of the reverse clutch 1024 remains drained via the port 1240a. Thus, in this state, even if the manual valve 1104 selects the position R, the piston chamber 1038 of the reverse clutch 1024 is not supplied with the oil pressure. With this valve, therefore, it is prevented that the power transmission mechanism is damaged as a result that the power transmission mechanism is put into the reverse drive state while the vehicle is travelling in the forward direction.

The lubrication valve 1124 comprises a valve bore 1250 having ports 1250a, 1250b, 1250c and 1250d, a spool 1252 having thereon lands 1252a and 1252b of the same diameter, and a spring 1254 biasing the spool 1252 leftwardly viewing in the Figure. The port 1250a is connected with the oil conduit 1164 communicating with the downstream side of the cooler 1260, the port 1250b is connected with the oil conduit 1162 forming the throttle pressure circuit, the port 1250c is connected with the oil conduit 1258 communicating with the upstream side of the cooler 1260, and the port 1250d is connected with the oil conduit 1200 forming the drain circuit. This lubrication valve 1124 uses the throttle pressure as a source of pressure, effects pressure regulation in the well known manner to produce at the port 1250a an oil pressure corresponding to the force of the spring 1254 and supplies this pressure to the oil conduit 1164. The oil in the oil conduit 1164 is supplied to the flumes 1016 and 1046 and used for lubrication before being drained to the tank 1130.

Referring to the control unit 1300 mentioned in the preceding description, the detailed description is found in co-pending U.S. Pat. Appln. Ser. No. 543,838, entitled "CONTROL SYSTEM FOR HYDRAULIC AUTOMATIC CLUTCH" (our ref.: U081-83), filed by the same applicants as those of the present application concurrently with the present application and claiming priority on four Japanese patent applications Nos. 57-184627, 58-40808, 58-70095 and 58-92418. This copending application has been incorporated herein in its entirety. Particularly attention is directed to the description along with FIGS. 3 through 21.

Hereinafter, it is described again regarding the operation of the maximum reduction ratio maintaining valve 1120. The spool 1232 stays in the position as illustrated by the upper half thereof as viewed in FIG. 2A until the rightward force derived from the oil pressure from the port 1230a (i.e., the drive pulley revolution speed indicative signal oil pressure) acting on the area of the land 1232*a* of the spool 1232 overcomes the sum of the force derived from the sum of the leftward force derived from the oil pressure in the port 1230*e* (i.e., the engine revolution speed indicative oil pressure signal) acting on the differential area between the lands 1232*b* and 1232*c* and the leftward force of the spring 1234. Thus, the drive pulley cylinder chamber 1030 is drained through the oil conduit 1180, port 1230*c*, port 1230*b* and oil conduit 1200. Since, even under this condition, the driven pulley cylinder 1046 is supplied with the line pressure, the continuously variable transmission is maintained in the largest reduction ratio state. Therefore, the largest reduction ratio is established irrespective of the oil pressure regulated by the shift control valve 1106 and develops in the oil conduit 1176. This state is maintained until the drive pulley revolution speed indicative oil pressure signal increases upto a value which is lower a predetermined value than the engine revolution speed oil pressure signal. That is, this state is maintained until the forward clutch 1004 increases its revolution speed to a certain degree after the engagement of the forward clutch has initiated (i.e., until the slip in the forward clutch decreased to a small degree). When the revolution speed of the drive pulley increases and thus the drive pulley revolution speed indicative oil pressure signal increases accordingly upto a value which is lower the predetermined value than the engine revolution speed indicative oil pressure signal, the maximum reduction ratio maintaining valve 1120 switches to the position as illustrated by the lower half thereof as viewed in FIG. 2A, allowing the port 1230*c* to communicate with the port 1230*d*, allowing the supply of oil pressure from the shift control valve 1106 to the drive pulley cylinder chamber 42, thus rendering the continuously variable transmission in shiftable state. Now, the reduction ratio can be controlled in the before mentioned manner by the shift control valve 1106. Once the spool 1232 of the maximum pressure maintaining valve 1120 has moved to the position as illustrated by the lower half thereof as viewed in FIG. 2A, the spool 1232 will not move back to the position illustrated by the upper half thereof as viewed in FIG. 2A until the drive pulley revolution speed indicative signal drops to a very low value because the oil pressure having acting on the differential area between the lands 1232*b* and 1232*c* is drained via the port 1230*f*. Therefore, the hunting of the valve 1120 near its switching point is prevented.

As will now be apparent from the above description, with the maximum reduction ratio maintaining valve 1120, the largest reduction ratio is maintained upon starting the vehicle irrespective of the state of the shift control valve 1106. This allows the vehicle to start even if the reduction ratio is fixed to a small reduction ratio due to the broken down of the reduction ratio control valve 1110, thus allowing the vehicle to start with the maximum reduction ratio.

As described above, according to the present invention, since there is provided a maximum reduction ratio maintaining valve which sets the distribution of oil pressure to the maximum or largest reduction ratio irrespective of the state of a reduction ratio control valve, the starting of a vehicle with a starting clutch (the forward clutch 4 or the reverse clutch 24) has been made easy and assured should a shift motor or a shift control valve go out of order.

What is claimed is:

1. In a hydraulic control system for a continuously variable V-belt transmission for a vehicle having an engine, the continuously variable V-belt transmission having a transmission mechanism including a driving pulley, a driven pulley, a V-belt running over both pulleys and a starting clutch which, when engaged, transmits an engine rotary power to the driving pulley,
a shift control valve means for controlling the distribution of fluid pressure to both pulleys to vary a reduction ratio between the driving and driven pulleys;
means for generating a driving pulley signal indicative of a revolution speed of the driving pulley;
a maximum reduction ratio maintaining valve means responsive to said driving pulley signal for setting the reduction ratio between the driving and driven pulleys at the largest reduction ratio irrespective of the state of said shift control valve, to thereby facilitate starting the vehicle.

2. A hydraulic control system as claimed in claim 1, wherein said shift control valve means controls the supply of fluid pressure to and discharge thereof from the driving pulley only, and wherein said maximum reduction ratio maintaining valve means includes a bore with an outlet port communicating with the driving pulley, an inlet port communicating with said shift control valve means to receive a regulated fluid pressure therefrom and a drain port, and also includes a spool movable responsive to said driving pulley signal within said bore between a first position wherein said outlet port communicates with said drain port only and a second position wherein said outlet port communicates with said inlet port only.

3. A hydraulic control system as claimed in claim 2, including means for generating an engine speed signal indicative of a revolution speed of the engine, wherein said maximum reduction ratio maintaining valve includes a spring biasing said spool toward said first position thereof, said spool being responsive also to said engine speed signal and being movable to said second position thereof when said driving pulley signal attains a predetermined relationship with said engine speed signal.

4. A hydraulic control system as claimed in claim 3, including a pressure regulator valve means for generating a line pressure, wherein said driven pulley communicates with said pressure regulator valve means to receive said line pressure.

5. A hydraulic control system as claimed in claim 1, wherein said maximum reduction ratio maintaining valve means is responsive to said driving pulley signal to cause the fluid pressure at the driving pulley to be set at a value which results in the largest reduction ratio irrespective of the state of said shift control valve.

* * * * *